United States Patent Office 3,597,228
Patented Aug. 3, 1971

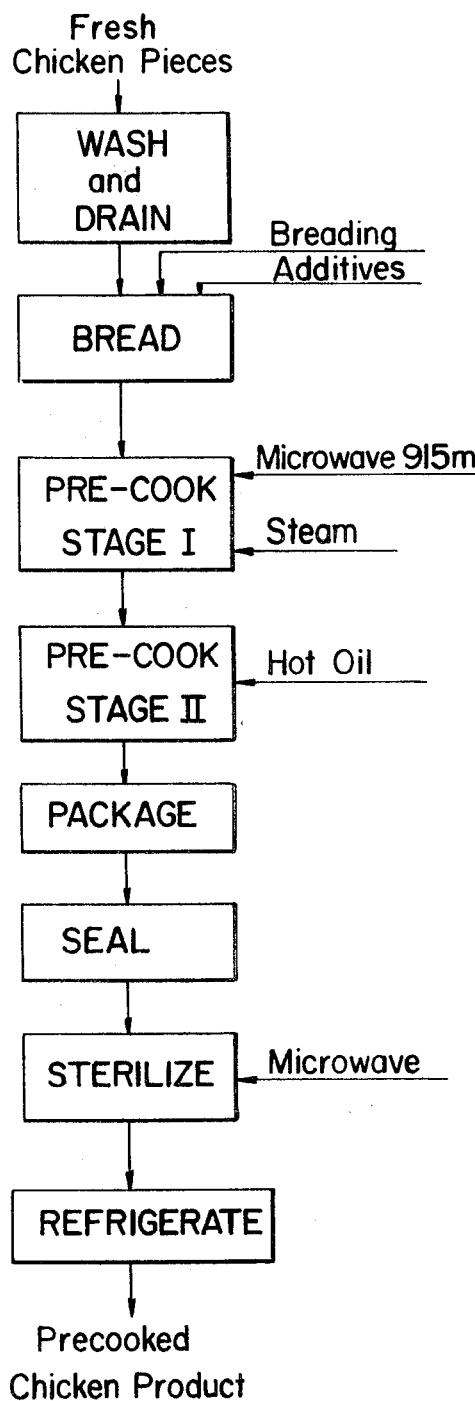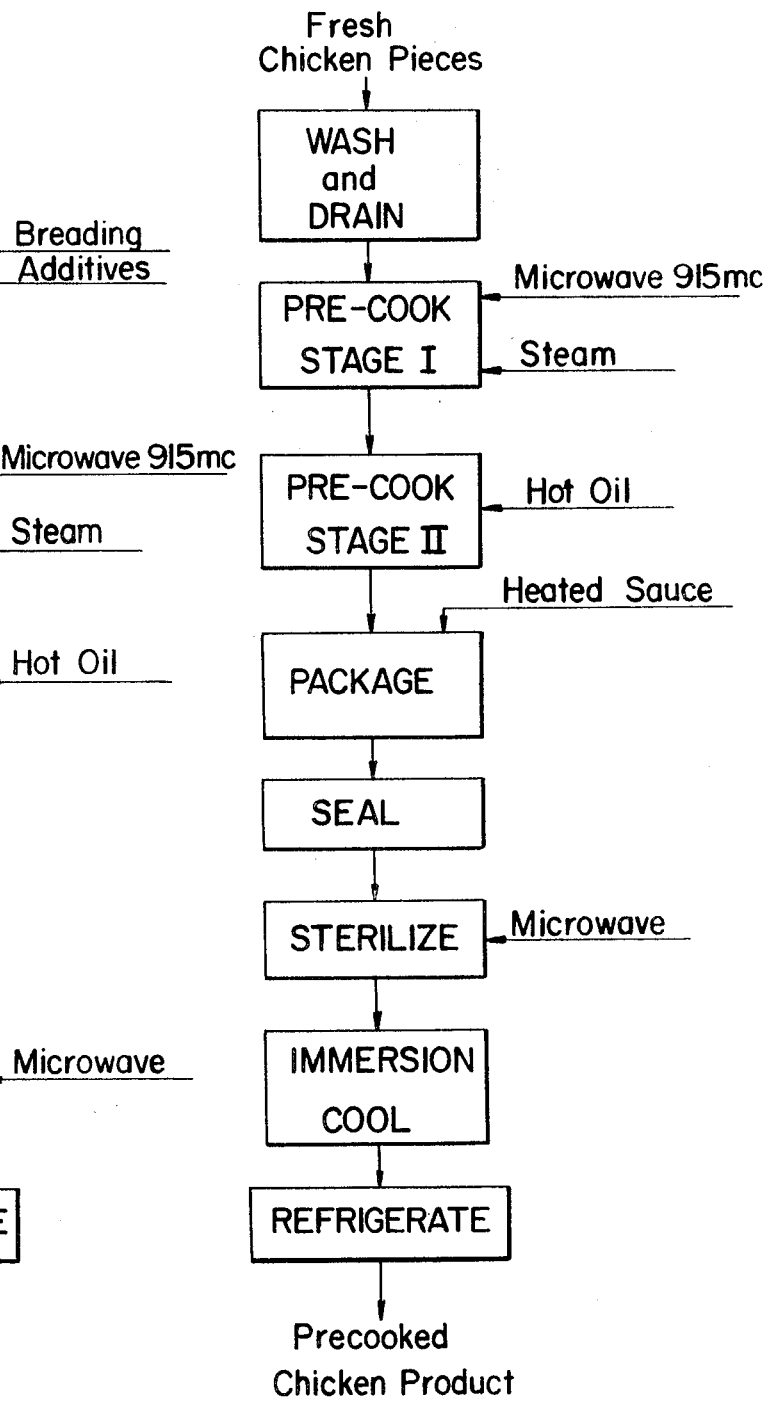
FIG_1  FIG_2
INVENTORS
MORRIS R. JEPPSON
CHARLES J. ROGERS

3,597,228
METHOD OF PREPARING PRECOOKED POULTRY PIECES
Morris R. Jeppson, Danville, and Charles J. Rogers, Sunol, Calif., assignors to Cryodry Corporation, San Ramon, Calif.
Filed June 30, 1967, Ser. No. 650,499
Int. Cl. A22c *21/00;* A23b *1/00*
U.S. Cl. 99—107                                             16 Claims

ABSTRACT OF THE DISCLOSURE

A precooked food product which can be stored under refrigeration and prepared for serving by a brief reheating is prepared from poultry by a combination of microwave, steam and oil cooking. The poultry may be breaded prior to the microwave treatment to prepare a fried chicken type of product or may be packaged in a reheatable container with any of various sauces.

---

This invention relates to food processing and more particularly to the preparation of precooked products from poultry.

The food processing industry has directed considerable effort to the development of precooked foods which can be prepared for serving by a simple and brief reheating step. Many of these "brown and serve" products have been enthusiastically received by consumers, particularly in those instances where the product has characteristics closely resembling those of the food as prepared by conventional cooking. The precooked foods greatly reduce the time and effort needed to prepare the food for serving and virtually eliminate the need for cooking skill on the part of the preparer.

While a variety of economically produced high quality precooked food products have been developed, certain other popular foods have been found to be more difficult to precook on a high volume production basis using known techniques. Poultry is one such food. Several substantial problems have been encountered in prior attempts to produce a quality precooked fried chicken type of product, for example, which can be stored under refrigeration prior to consumption.

High volume processing of chicken by conventional frying followed by refrigeration requires a cooking time approaching one hour and involves a serious weight loss, typically about 25%. Such a product is necessarily expensive. Further, the taste characteristics of conventionally fried chicken which has been refrigerated and subsequently reheated are not comparable with the freshly cooked product. Accordingly, various other techniques have been proposed for preparing precooked chicken.

One such technique comprises precooking chicken pieces in a steam chamber. This process also requires cooking times approaching one hour and does not provide a product with the characteristics which the consumer associates with fried chicken. The product tends to be unevenly cooked with the interior portions of the thick pieces being somewhat underdone while the surface regions tend to be overdone and soggy. The skin has a tendency to detach from the chicken parts and at best lacks the preferred crispness and golden coloring. Further, a phenomenon known as bone darkening tends to occur and produces an internal coloration which is unattractive to the consumer.

To avoid some of these problems, it has been proposed to precook chicken and other poultry by a combination of steam and microwave heating. By this means, cooking time can be reduced to as little as several minutes. The dramatic reduction in processing time results from the fact that microwave provides a unique form of heating in that the heat is generated within the interior of the product whereas other heating methods rely on the conduction of heat from the surface inwardly. Microwave heating by itself has a tendency to cook the interior regions of the product much more strongly than the surface regions and has an undesirable dehydrating effect. However, by combining microwave and steam, all portions of the poultry pieces are cooked and a highly desirable moist product is produced. There is little tendency for skin to loosen and a high degree of tenderness is obtained. However, the product still lacks the taste, texture and appearance, particularly in the surface regions, which a consumer associates with fried chicken.

Accordingly, known techniques do not provide for the economical high volume production of precooked storable poultry food products having all of the flavor, texture and appearance characteristics which are desired by consumers.

The present invention provides a precooked storable food product from poultry which has highly desirable flavor, texture and coloration, the product being economically produced on a high volume, high yield basis through a unique combination of steps in which both microwave heating in a hot, humid atmosphere and hot oil cooking are utilized. In one variation of the invention, chicken parts are breaded prior to the microwave and steam heating to produce a high quality product having the characteristics of conventionally fried chicken. In another variation, microwave, steam and oil cooked poultry pieces are packaged with a sauce in a container in which the product can be reheated for serving.

Accordingly, it is an object of this invention to provide a practical high yield, high volume, method for producing precooked storable food products from poultry which have preferred flavor, texture and coloration characteristics.

It is another object of the invention to provide a storable "brown and serve" food product having the characteristics of fried chicken.

It is still another object of the invention to provide an attractive commercial food product comprised of poultry pieces and sauces which can readily be reheated for serving within the storage container.

The invention, together with further objects and advantages thereof, will best be understood by reference to the following specification in conjunction with the accompanying drawing, of which:

FIG. 1 is a block diagram showing successive steps in a process for preparing a precooked fried chicken type of product from fresh chicken pieces; and FIG. 2 is a block diagram showing successive steps in the preparation of a precooked chicken in sauce product.

Two considerations of primary importance in gaining consumer acceptance of precooked or "brown and serve" food products are cost and quality. As hereinbefore discussed, prior methods proposed for the commercial production of precooked poultry foods have tended to require concessions in one of these considerations in order to improve the other. In most cases, the consumer prefers a product having the properties of a home cooked food and in general this requires long cooking periods and involves substantial weight losses during processing. This adds very substantially to production cost where the operations are carried out on a high volume basis.

As a practical matter, cost considerations virtually dictate that commercial producers of such products utilize less conventional cooking techniques. On a cost basis and with due regard to product quality, a combination of steam and microwave heating has many advantages. Processing times need not exceed several minutes and weight losses are minimized. However, difficulties have been encountered in applying this technique in that the characteristics of the finished product differ substantially from those preferred by consumers. The product tends to have an undesirable grayish coloration and lacks crispness at the skin and surface regions. Very importantly, where young chickens or fryers provide the raw material, there is lack of the distinctive characteristic chicken flavor in the product.

We have found that these undesirable characteristics, including the lack of preferred flavor in a microwave cooked chicken product, result at least in part from an absence of very high localized temperatures during the microwave precooking. We now find that the pronounced advantages of microwave processing of poultry foods can be retained while preparing a very high quality product resembling conventionally prepared food by combining microwave heating of chicken pieces in a steam environment with a short hot oil cooking step which generally follows the microwave heating. The oil cooking step produces browning reaction products which fully develop the preferred flavor and impart crispness and the desirable golden coloration to the product surface. Further, chicken pieces subjected to this two staged treatment are highly tender, moist and possess an excellent shelf life under refrigeration.

The microwave, steam, and hot oil treatment in turn combines with certain other steps to produce further advantages. In the preparation of a precooked fried chicken type of product, for example, a breading mix is applied to the chicken pieces. We have found that by applying the breading mixture prior to the microwave heating operation, a much improved adherence to the chicken results. In addition to providing for a high quality product, this gives rise to certain indirect processing efficiencies. The more adherent breading is less likely to contaminate the oil used in the subsequent oil cooking step. Further, since the breading is applied prior to any form of cooking, it is unnecessary to chill the chicken pieces in order to bread the product between successive cooking steps.

We have also found that the difficulties which have heretofore been experienced with bone darkening can be alleviated by the proper choice of microwave frequency, specifically by utilizing the lower frequencies, typically 915 megacycles, within the range allotted to industrial microwave equipment. This avoidance of bone darkening is believed to result from the greater penetration of the lower frequencies into thick portions of the poultry pieces and the consequent very rapid heating at the interior. Bone darkening appears to result from the outward migration of soluble liquids from the interior of the bone under mild heating. The phenomenon is stopped when the bone region reaches coagulation temperature, typically about 140° F. This temperature is reached very rapidly with lower frequency microwave so that little liquid migration occurs.

A further very desirable result of this combination of steps is a more thorough bacteria kill, thereby enhancing the storability of the product.

The invention may be more fully understood by considering the sequence of steps and materials utilized in the application of the process to specific types of poultry food products. FIG. 1 of the drawing shows, schematically, the steps involved in producing a precooked fried chicken product which can be stored under refrigeration and which may be prepared for serving by a brief reheating in the home or elsewhere.

The preferred raw material for the process is the type of chicken known as a fryer and as an initial step the chickens are divided into pieces which are washed and drained. In addition to cleaning the fresh chicken pieces, this step insures that a moist surface is present for proper pick-up of breading.

The chicken parts are then breaded, preferably in a tumbler. Various known breading mixtures may be used for this purpose and may include additives such as yeast powder and hydrolyzed proteins for promoting flavor development. The additives are often desirable in that fryers lack a pronounced chicken flavor in comparison to older but tougher birds. Flavor development in fryers is promoted by the application of high temperatures to the surface and this may be enhanced by the additives.

It is usually preferable not to use a batter to avoid having a heavy coating on the chicken pieces. With an unduly heavy coating, the finished product may tend to have somewhat the character of steamed chicken beneath the batter and the preferred skin crispness may be lacking.

Following breading, chicken pieces are subjected to an initial cooking step in which the primary heating medium is microwave energy. The microwave heating is supplemented by maintaining an atmosphere of steam or other hot humid gas within the microwave heating chamber. A continuous process microwave heating apparatus suitable for this purpose is disclosed in co-pending application Ser. No. 604,106 of Morris R. Jeppson entitled Method and Apparatus for Treating Food Products and the Like With Microwave Energy, filed Nov. 28, 1966, now U.S. Pat. No. 3,409,447 granted Nov. 5, 1968. Heating periods for this step typically range from about three minutes to about six minutes, depending on characteristics of the specific chicken pieces, energy density within the microwave chamber, and other variables. The interior portions of the chicken pieces are very rapidly and fairly uniformly heated by inter-action of the micrcowave energy with the moisture content of the chicken. The steam environment aids in cooking the skin and surface regions of the meat which tend to remain cooler, due to moisture evaporation, if microwave heating is used alone. The steam environment also avoids the loss of moisture which can occur when microwave heating is employed alone.

Industrial microwave equipment is required by governmental regulations in the United States at this time to operate at one of two frequencies, specially either 915 megacycles or 2450 megacycles. Preferred results, including an alleviation of bone darkening problems, are obtained in the present invention if the 915 megacycle microwave energy is employed.

Following the initial cooking stage with combined microwave and steam, the chicken pieces are subjected to a brief second cooking stage in hot oil. This deep fat cooking typically uses a vegetable oil at about 340° F. and lasts for about one minute. The short oil frying step imparts the desired surface color appearance and crispness, develops flavor and provides an oil coating on the breaded product for proper finishing at the time that the product is reheated for serving. In addition to these factors, the resulting coating makes the product more resistant to bacteria contamination during subsequent handling.

It is possible in some instances to perform the oil cooking step prior to microwave cooking; however, better results are generally obtained if the oil cooking follows the microwave heating. Oil cooking before microwave cooking may require a longer frying time and there is a tendency for the product surface to become too moist from water driven to the surface during the subsequent microwave cooking step.

Following the second cooking stage, the chicken pieces are disposed in a suitable package and the packages are then sealed. Various packages or containers may be utilized; however, it is preferable to employ a type which can be used for reheating the product prior to serving. Aluminum trays with a plastic overwrap are an excellent container for this purpose.

Depending on the nature of the processing techniques and the equipment utilized following the two cooking stages, it may be desirable to follow the packaging and sealing operations with a sterilization or pasteurization step. One very convenient technique for performing this step is a second brief microwave irradiation of the packaged product. If conditions are such that the packaging and sealing are accomplished under aseptic condition, no sterilization step is ordinarily needed.

The process is completed by refrigerating the packaged products for storage and distribution. If kept within a temperature range from about 30° F. to about 50° F., the product has a normal shelf life of up to three weeks which considerably exceeds that of refrigerated fresh chicken. This provides ample time for distribution and sale through normal commercial outlets. Still longer shelf life is obtainable if the product is frozen, although this requires additional time in preparing the product for serving in that thawing is necessary prior to reheating.

The product is quickly and easily prepared for serving by being reheated by the consumer, generally in the original container with the plastic overwrap removed. This is most conveniently done in an ordinary home oven at about 375° F. and may require about thirty minutes. The reheated product is comparable in taste, texture, appearance and general quality with conventional fried fresh chicken.

While a variety of forms of equipment may be used to perform the above described steps, the process is fully susceptible to conveyorized continuous process operation to obtain high volume production with minimized costs.

In a representative example of the above described process, approximately 1,000 grams of fryer chicken were divided into standard pieces, washed with water, and drained. The chicken pieces were then tumbled in a breading mix which included pregelatinized flour, flour, milk powder, salt, vegetable coloring extractives, a light yeast powder, a flavor additive and seasonings. The chicken pieces were then subjected to about 3.2 kilowatts of microwave energy at a frequency of 915 megacycles in a conveyorized microwave heating apparatus for a period of six minutes and in the presence of a steam atmosphere. The chicken pieces were then further cooked in deep fat for one minute at a temperature of 340° F. Following the oil cooking, the chicken pieces were packed in an aluminum tray, cooled and the tray and contents thereof were enclosed with a plastic overwrap. The packaged chicken pieces were then refrigerated and stored for a period of 28 days at a temperature of about 45° F. Subsequently, the overwrap was removed and the tray and contents were reheated in a 375° F. oven for thirty minutes. The prepared product was found to be comparable to conventionally fried fresh chicken and to be of excellent quality.

Variations of the process may be utilized to produce other highly desirable precooked poultry foods. FIG. 2 shows a modification of the process which produces a very appetizing chicken in sauce product. The initial steps of this process are essentially similar to those previously described except that the breading step is omitted. Thus, fresh chicken pieces are washed and drained and subjected to an initial cooking step utilizing combined microwave energy and steam under conditions similar to those previously described. This is followed by a brief second stage cooking step in hot oil, also similar to that previously described.

Following the second cooking step, the still hot chicken is packaged in a sealable container, preferably in a boilable plastic bag. Prior to sealing of the container, the desired sauce is added, usually in a quantity sufficient to substantially cover the chicken. The sauce should have a temperature of at least 180° F. and is preferably of a slightly acid type. A heated acid type sauce filling contributes to an extended shelf life of the product under refrigeration. Sauces which are suitable for this purpose are barbecue, cacciatore, spanish, adobo, and others. Other ingredients which combine well with chicken, such as mushrooms, may be included with the sauce. Following packaging and the addition of the sauce, the containers are sealed and subsequently cooled by immersion in cold water, for example. The packaged product may then be refrigerated, stored and distributed as in the previous instance.

The consumer may readily prepare the product for serving by simply placing the bag and contents in boiling water for a period of about twelve minutes. Alternately, the chicken and sauce may be transferred from the storage container to a baking dish and heated for about thirty minutes in a 375° F. oven. In the latter case, basting should be performed once or twice during the reheating period.

In one example of the application of the process of FIG. 2, a sample of about 1000 grams of fryer chicken pieces was washed and drained and subjected to a first cooking step by passage through a conveyorized microwave heating apparatus, again with a 3.2 kw. hour input and in the presence of a steam atmosphere. The chicken pieces were then further cooked in hot oil at 340° F. for one minute. The chicken pieces were then disposed in a plastic bag and barbeque sauce at a temperature of 180° F. was introduced in the bag in an amount sufficient to cover the chicken pieces therein. The bag was then sealed, cooled by immersion in cold water, and refrigerated. After a period of 28 days of storage under refrigeration at a temperature of about 45° F., the still sealed bag was placed in boiling water for twelve minutes and served. The product was found to be extremely flavorful, attractive and comparable with carefully prepared fresh foods.

It should be understood that still other variations of the process are possible within the scope of the invention, and that the above described techniques are applicable to other poultry products besides chicken. The combination of microwave cooking in a steam atmosphere and hot oil cooking is readily applicable to turkey, for example. Thus, while the invention has been described with reference to certain specific embodiments, many modifications are possible and it is not intended to limit the invention except as defined in the following claims.

What is claimed is:

1. In a method for preparing precooked poultry pieces the combination of steps comprising:
   cooking said poultry pieces with microwave energy in a hot humid gas environment; and
   oil cooking said poultry pieces.

2. The combination defined in claim 1 wherein said hot humid gas environment is comprised of steam.

3. The combination of steps defined in claim 1 wherein said microwave cooking step precedes said oil cooking step.

4. The combination of steps defined in claim 1 wherein said microwave energy has a frequency of about 915 megacycles.

5. The combination of steps defined in claim 1 wherein said poultry pieces are sealed within heatable containers and refrigerated for storage following said cooking thereof.

6. The combination of steps defined in claim 5 wherein said poultry pieces are sterilized by microwave irradiation following said sealing in said containers.

7. The combination of steps defined in claim 1 wherein said poultry pieces are cooked by said microwave energy for a period from about three minutes to about six minutes and wherein said oil cooking of said poultry pieces is performed for about one minute in oil having a temperature of about 340° F.

8. The combination of steps defined in claim 1 comprising the further step of breading said poultry pieces prior to said cooking by microwave energy.

9. In a method for preparing precooked poultry pieces, the steps comprising:
   breading said pieces;
   subsequently precooking said pieces with microwave energy in a hot, humid gas atmosphere;
   further cooking said poultry pieces in hot oil; and
   subsequently chilling said pieces for storage.

10. In a method of preparing a precooked fried chicken type of product, the steps comprising:
  washing and draining chicken pieces;
  breading said chicken pieces;
  subjecting said breaded chicken pieces to a first precooking step utilizing a combination of microwave energy and steam;
  subjecting said chicken pieces to a second precooking step utilizing hot oil;
  packaging and sealing said chicken pieces; and
  refrigerating said chicken pieces for storage and distribution.

11. The combination of steps defined in claim 10 wherein said chicken pieces are breaded with a mixture having flavor development additives therein.

12. The combination of steps defined in claim 10 wherein the microwave energy employed in said first precooking step has a frequency of about 915 megacycles and wherein said first precooking step is performed for a period from about three minutes to about six minutes, and wherein said second precooking step is performed with oil at a temperature of about 340° F. for a period of about one minute.

13. The method according to claim 10 comprising the further step of subsequently reheating said chicken pieces whereby said chicken pieces have the flavor, texture and characteristics of freshly fried chicken.

14. In a method for preparing a precooked poultry food product, the combination of steps comprising:
  subjecting poultry pieces to a first precooking stage utilizing microwave energy in a hot humid gas environment;
  subjecting said poultry pieces to a second precooking stage utilizing hot oil;
  adding a heated sauce to said poultry pieces;
  sealing said poultry pieces and sauce in a container; and
  refrigerating the sealed container for storage and distribution of said product.

15. The combination of steps defined in claim 14 wherein said heated sauce is of an acid type.

16. The combination defined in claim 14 wherein said heated sauce has a temperature of at least 180° F.

References Cited

UNITED STATES PATENTS

| | | | |
|---|---|---|---|
| 3,193,394 | 7/1965 | Kubala et al. | 99—107X |
| 3,245,800 | 4/1966 | Sanders | 99—107 |
| 3,365,301 | 1/1968 | Lipoma et al. | 99—100 |
| 3,398,251 | 8/1968 | Jeppson et al. | 99—107X |

HYMAN LORD, Primary Examiner

U.S. Cl. X.R.

99—187, 194, 217, 221